UNITED STATES PATENT OFFICE 2,306,731

RUBBER HYDROCHLORIDE COMPOSITIONS

George E. Hulse, Passaic, N. J., assignor to United States Rubber Company, New York, N. Y., a corporation of New Jersey No Drawing. Application October 21, 1939, Serial No. 300,586

7 Claims. (Cl. 260—735)

This invention relates to new compositions of matter comprising rubber-hydrogen chloride reaction products, particularly to transparent films and lacquers.

An object of the invention is to provide a new class of photochemical inhibitors for rubber hydrochloride films, particularly for transparent rubber hydrochloride films. Other objects will be apparent from the following description.

Hitherto the effectiveness of chemical stabilizers of rubber hydrochloride has been limited by their lack of solubility in the film, their volatility from the film, or discoloration of the film on aging.

The present invention provides chemicals which are compatible with rubber hydrochloride and which enable the production of films which are clear and free from haze or color and which do not discolor during light aging. The chemicals furthermore do not impart any odor to the films, which makes their use as wrappers for food materials desirable. Compared with other chemicals previously used for the purpose the films of the present invention retain their usefulness longer because of better retention of strength and flexibility.

Broadly the invention comprises the use, as chemical stabilizers in rubber hydrochloride compositions, of triaryl stibines, which have the formula

where Sb represents antimony and R represents an aryl group. More particularly, the invention comprises the incorporation in rubber hydrochloride films of triaryl stibines of the benzene series.

Examples of such triaryl derivatives included within the scope of the invention are: tri-phenyl stibine, tri-o-tolyl stibine, tri-xylyl stibine, trixenyl stibine, tri-benzyl stibine, tri-alpha naphthyl stibine, tri-beta naphthyl stibine, and tri-anisyl stibine.

The rubber hydrochloride may be produced by passing hydrogen chloride gas into a rubber cement, as disclosed by Bradley and McGavack (U. S. Patent 1,519,659), or by reacting rubber with hydrogen chloride gas at a low temperature (disclosed by Gebauer-Fullnegg and Moffet U. S. Patent 1,980,396) or by any other method.

If the rubber hydrochloride is sufficiently soluble it can be made into a cement to which a triaryl stibine is added in such amount as has been determined by experiment to give effective protection against light ageing. The cement may then be cast into film or used as a lacquer.

Some products of rubber and hydrogen chloride are not sufficiently soluble to form spreading cements. The tri-aryl stibine stabilizers may be incorporated into such rubber hydrochlorides by milling on a rubber mill. Films can then be produced by calendering the mixture.

Rubber hydrochloride films having incorporated therein a tri-aryl stibine in accordance with the invention have been found to be more resistant to deterioration upon exposure to light than films containing no added stabilizer.

The following table illustrates the improvements in ageing obtained by incorporating 2% by weight of a triaryl stibine in transparent films of rubber hydrochloride:

| Stabilizer | Hours of exposure until brittle |
|---|---|
| None | 23 |
| Triphenyl stibine | 38 |
| Tri-o-tolyl stibine | 48 |

The films (thickness .001 inch) were aged in a standard Fade-Ometer at 110° F.

Triaryl stibines may be prepared by treating the respective aryl bromide with antimony trichloride and an excess of sodium in the presence of a solvent such as benzene or xylene.

The new stabilizers may be used with rubber hydrochlorides having any hydrogen chloride content in the range commercially available, and especially with rubber hydrochloride having a hydrogen chloride content of over 30% and being in the form of transparent film suitable for photographic film or for wrapping purposes.

The rubber hydrochloride stabilized by the chemicals disclosed herein may be used in various forms and for the various purposes for which rubber hydrochloride compositions are generally known to be used.

Having thus described my invention, what I claim and desire to protect by Letters Patent is:

1. A rubber hydrochloride composition containing a triaryl stibine in a small amount effective to retard photochemical disintegration of the rubber hydrochloride, and each of the aryl groups having a carbon directly attached to the antimony.

2. A pellicle comprising a rubber hydrochloride composition containing a triaryl stibine in a small amount effective to retard the photochemical disintegration of the rubber hydrochloride, each of the aryl groups being an aryl hydrocarbon group, and each of the aryl groups having a carbon directly attached to the antimony.

3. A transparent pellicle comprising a rubber hydrochloride composition containing a triaryl stibine in a small amount effective to retard the photochemical disintegration of the rubber hydrochloride, each of the aryl groups being an aryl hydrocarbon group, and each of the aryl groups having a carbon directly attached to the antimony.

4. A rubber hydrochloride composition containing triaryl stibine of the benzene series in a small amount effective to retard the photochemical disintegration of the rubber hydrochloride, each of the aryl groups being an aryl hydrocarbon group.

5. A rubber hydrochloride composition containing triphenyl stibine in a small amount effective to retard photochemical disintegration of the rubber hydrochloride.

6. A rubber hydrochloride composition containing tri-ortho-tolyl stibine in a small amount effective to retard photochemical disintegration of the rubber hydrochloride.

7. A product composed at least in part of rubber hydrochloride stabilized with a triaryl stibine in a small amount effective to retard the photochemical disintegration of the rubber hydrochloride, each of the aryl groups being an aryl hydrocarbon group, and each of the aryl groups having a carbon directly attached to the antimony.

GEORGE E. HULSE.